United States Patent [19]

Muromachi et al.

[11] Patent Number: 5,130,183
[45] Date of Patent: Jul. 14, 1992

[54] HEAT RAY SCREENING GLASS

[75] Inventors: Takashi Muromachi, Kawasaki; Jun Kawaguchi, Yokohama; Hidemi Nakai, Tsukuba, all of Japan

[73] Assignee: Nippon Sheet Glass Co., Ltd., Osaka, Japan

[21] Appl. No.: 533,379

[22] Filed: Jun. 5, 1990

[30] Foreign Application Priority Data

Jun. 6, 1989 [JP] Japan .................... 1-143446

[51] Int. Cl.$^5$ .............................. B32B 17/06
[52] U.S. Cl. ........................ 428/216; 428/212; 428/213; 428/426; 428/432; 428/698; 428/699; 428/701; 428/702
[58] Field of Search .............. 350/164, 166, 1.1; 428/212, 213, 426, 432, 701, 702, 698, 699, 216

[56] References Cited

U.S. PATENT DOCUMENTS

| | | | |
|---|---|---|---|
| 4,377,613 | 3/1983 | Gordon | 428/212 |
| 4,690,871 | 1/1987 | Gordon | 428/432 |
| 4,834,857 | 5/1989 | Gillery | 428/432 |
| 4,900,630 | 2/1990 | Suzuki | 428/701 |
| 4,940,636 | 7/1990 | Brock et al. | 350/164 |

FOREIGN PATENT DOCUMENTS

| | | |
|---|---|---|
| 3902456 | 8/1982 | Fed. Rep. of Germany . |
| 0126601 | 7/1985 | Japan . |
| 64-5930 | 1/1989 | Japan . |
| 1292717 | 10/1972 | United Kingdom . |

Primary Examiner—Ellis P. Robinson
Assistant Examiner—Archene A. Turner
Attorney, Agent, or Firm—Woodcock Washburn Kurtz Mackiewicz & Norris

[57] ABSTRACT

A heat ray screening glass according to this invention comprises a sheet glass, a first layer covered on the sheet glass and which is 55 nm to 70 nm thick and has a refractive index of 1.8 to 2.1 at a wavelength of 550 nm, a second layer covered on the first layer and consisting of a $TiO_2$ film which is 30 nm to 55 nm thick and has a refractive index of 2.3 to 2.5 at a wavelength of 550 nm, and a third layer covered on the second layer and which is 45 nm to 60 nm thick and has a refractive index of 1.8 to 2.1 at a wavelength of 550 nm, wherein the change in color of the light transmitted through and reflected on the sheet ray screening glass is very little, and a comparative high visible light transmittance and a low visible light reflectivity in the glass can be obtained.

9 Claims, 2 Drawing Sheets

FIG.IA
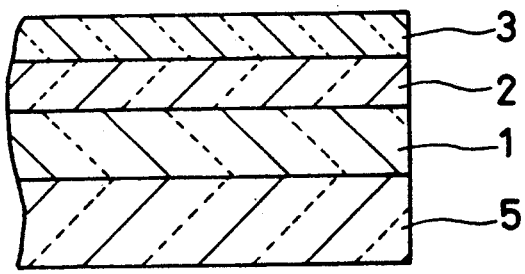
FIG.IB
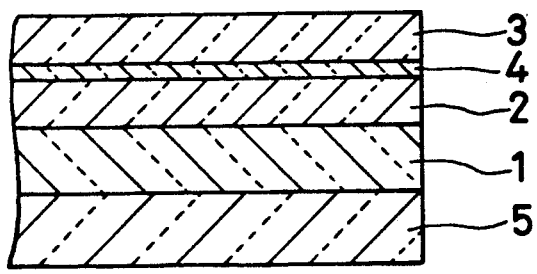

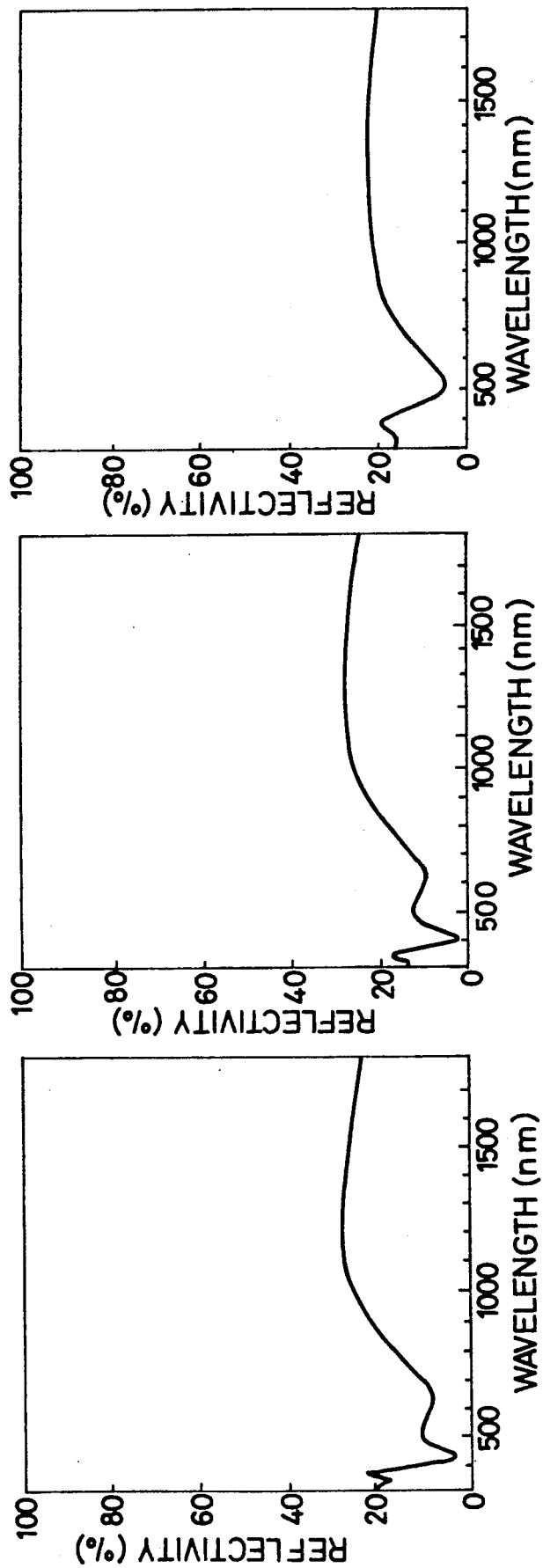

HEAT RAY SCREENING GLASS

BACKGROUND OF THE INVENTION

1. Field of the Invention

The present invention relates to a heat ray screening glass which has a high visible light transmittance and a low visible light reflectivity and is capable of screening a part of the solar radiation energy. It is particularly suitable for use as automotive window glass and building glazing.

2. Description of the Prior Art

Among the known glasses having a high visible light transmittance and is capable of screening a part of the solar radiation energy, is one which is composed of a glass substrate, a layer of oxide having a high refractive index, a layer of metal nitride, and a layer of oxide having a high refractive index. These layers are laminated on the glass substrate. (See SPIE. vol. 324 (1982) 52.) There is known a heat ray screening glass in which the oxide having a high refractive index consists of chemically stable $TiO_2$ or $SnO_2$ and the metal nitride consists of chemically stable nitride of Ti, Zr, or Hf which belong to Group IVa of the Periodic Table. It has good durability and can be used alone as a single plate.

The conventional heat ray screening glass has a disadvantage that when a light is transmitted through and reflected on the conventional glass it produces strong interference colors (red, reddish purple, yellow, etc.) because of the interference between the laminated layers and a visible light. These interference colors make the glass look to be different from the glass itself and hence are undesirable from the standpoint of design when the glass is used for automotive windows. The heat ray screening glass for automotive windows should be able to reduce the amount of direct sunlight entering the automotive room, thereby making the driver and passengers feel comfortable. From the standpoint of design, it is strongly required to keep the own color of the glass.

OBJECT AND SUMMARY OF THE INVENTION

It is an object of the present invention to provide a heat ray screening glass which hardly changes the colors of the transmitted light and the reflected light in practice, has a comparatively high visible light transmittance, a low visible light reflectivity, a good heat ray screening performance, and a good durability that it can be used alone for window glass without the need of being made into laminated glass.

In order to achieve the above object of the present invention, there is provided a heat ray screening glass comprising a sheet glass, a first layer covered on the sheet glass and which is 55 nm to 70 nm thick and has a refractive index of 1.8 to 2.1 at a wavelength of 550 nm, a second layer covered on the first layer and consisting of a $TiO_2$ film which is 30 nm to 55 nm thick and has a refractive index of 2.3 to 2.5 at the wavelength, and a third layer covered on the second layer and which is 45 nm to 60 nm thick and has a refractive index of 1.8 to 2.1 at the wavelength.

According to the present invention, the first layer and the third layer each having a refractive index of 1.8 to 2.1 at the wavelength and the $TiO_2$ film (the second layer) having a refractive index of 2.3 to 2.5 at the wavelength to be laminated on the sheet glass (substrate) should have specific thicknesses so that they provide a high transmittance for visible light and a high reflectivity for near infrared rays (solar radiation energy). The specific thicknesses are also established so that the transmission and reflection of visible light do not produce any color which stands out in practical use.

The layers which meet the requirement for the above-mentioned optical characteristics should have their respective thicknesses which are determined in relation to one another, not individually. The first layer should have a thickness of 55 to 70 nm; the second layer ($TiO_2$ film) should have a thickness of 30 to 55 nm; and the third layer should have a thickness of 45 to 60 nm. If the respective thickness are beyond the respective ranges specified as mentioned above, the laminated films produce interference colors and decrease the reflectivity for near infrared rays thereby deteriorating the heat ray screening performance. The thicknesses of the three layers are determined as mentioned above, so that an absolute value of the difference in the color between the light of the glass substrate and the transmitted light or the reflected light is less than 0.03 in terms of x-value and y-value of chromaticity coordinates. Since the absolute value of the difference in the color is too small, it is substantially impossible for the naked eyes to distinguish the color difference in practical use.

It is required that the first layer and the third layer have a lower refractive index than that of the second layer ($TiO_2$ film), as specified above.

The first layer and the third layer preferably consist of an oxide film selected from a group of $SnO_2$, $ZrO_2$, $Al_2O_3$, $Ta_2O_5$, ZnO and $In_2O_3$. The $SnO_2$ film is more preferably for the first and third layers. The film of each oxide mentioned above has a refractive index of 1.8 to 2.1 at a wavelength of 550 nm. The $TiO_2$ film has a refractive index of 2.3 to 2.5 at the wavelength.

The heat ray screening glass as mentioned above further preferably comprises a film of nitride of Ti, Zr, or Hf between the second layer and the third layer, said film having a thickness not greater than 10 nm. The metal nitride film itself has the heat ray screening performance, therefore, it helps the heat ray screening glass to effect the improved heat ray screening performance without causing coloring which is deleterious to the practical use. The metal nitride film should have a thickness not greater than 10 nm. If the thickness of the metal nitride film is beyond 10 nm, the metal nitride film absorbs a certain quantity of visible light, so that the glass cannot sufficiently transmit the light and looks like dark. The thickness is adjusted and a metal for the nitride is selected from Ti, Zr, and Hf so that the lightness and the heat ray screening performance of the heat ray screening glass are adjusted.

In the heat ray screening glass having four layers including the film of the nitride of a metal selected from Ti, Zr, and Hf, the metal nitride film is interposed between the upper oxide film (the third layer) and the lower two oxide films. In the lower two oxide films, the one (the first layer) consisting of a film having a lower refractive index is provided adjacent to the glass substrate and the other (the second layer) consisting of a $TiO_2$ film having a higher refractive index is provided adjacent to the metal nitride film.

The first and third layers may be formed by any process which is not specifically limited, so long as it is capable of forming a substantially transparent oxide film having a predetermined refractive index, which is 1.8 to 2.1 at a wavelength of 550 nm. It is usually formed by the sputtering process or arc deposition process which can cover a glass of large area with a uniform film. The $TiO_2$ film for the second layer may be formed by any process which is not specifically limited, so long as it is capable of forming a substantially transparent oxide film having a predetermined refractive index, which is 2.3 to 2.5 at a wavelength of 550 nm. It is usually formed by the sputtering process or arc deposition process, as in the case of $SnO_2$ film.

The film of nitride of Ti, Zr, or Hf which is interposed between the second and third layers may be formed by reactive sputtering or arc deposition process which is carried out in a nitrogen-containing atmosphere under reduced pressure using a metallic Ti, Zr, or Hf as the target.

The glass substrate for the heat ray screening glass of the present invention is not specifically restricted in its composition, so long as it is transparent. It is usually transparent or colored (bronze, gray, or blue) sheet glass formed by the float process.

The laminated layers (the first to third layers) in the heat ray screening glass cause the glass to reflect a part of the solar radiation energy and to produce substantially no color in the reflection light and the transmission light, while keeping a high visible light transmittance owing to the optical interference of the first to third layers.

The metal nitride film which is an additional layer interposed between the second and third layers causes to absorb a part of visible rays and reflects a part of near infrared rays, thereby enhancing the ability to screen the solar radiation energy. The second layer ($TiO_2$ film) which has a higher refractive index than that of the first layer prevents the glass from being colored by interference of the reflected light.

BRIEF DESCRIPTION OF THE DRAWINGS

FIG. 1A is a partially sectional view of the heat ray screening glass of the embodiment according to the present invention, FIG. 1B is a partially sectional view of the heat ray screening glass of another embodiment according to the present invention, FIG. 2A is a graph showing the spectral reflectance of the heat ray screening glass in Example 1, FIG. 2B is a graph showing the spectral reflectance of the heat ray screening glass in Example 2, FIG. 3 is a graph showing the spectral reflectance of the conventional glass in Comparative Example.

DETAIL DESCRIPTION OF THE PREFERRED EMBODIMENTS

Preferred embodiments according to the present invention will be described in detail with reference to the accompanying drawings.

The heat ray screening glass of the embodiment comprises a sheet glass 5 as a substrate, a $SnO_2$ film as a first layer 1, a $TiO_2$ film as a second layer 2, a $SnO_2$ film as a third layer 3, as shown in FIG. 1A.

The heat ray screening glass of another embodiment further comprises a film 4 consisting of nitride of Ti, Zr, or Hf in the glass, as shown in FIG. 1B. The metal nitride film 4 is interposed between the second layer 2 and the third layer 3.

The following samples of the heat ray screening glass were made as Examples 1 to 12 and Comparative Example. Note that the structure of laminated layers in Example 1, 3 to 7 is the same as shown in FIG. 1A, in Example 2, 8 to 12 is the same as shown in FIG. 1B.

EXAMPLE 1

In a magnetron sputtering apparatus equipped with two magnetron cathodes were placed tin and titanium targets as cathodes. A 4 mm thick colored sheet glass 5 ("Bronze pane", a product of Nippon Sheet Glass Co., Ltd.), measuring 100 mm $\times$ 100 mm, with its surface cleaned, was mounted on the substrate holder in the vacuum chamber of the sputtering apparatus. The vacuum chamber was evacuated to $7 \times 10^{-4}$ Pa using a cryopump. Into the vacuum chamber was introduced a mixture gas composed of 20 vol.% of argon and 80 vol.% of oxygen, and the pressure was adjusted to 0.33 Pa. Sputtering was carried out for a predetermined period of time by applying a cathode voltage of 400 V and a cathode current of 5 A to the tin target to form a 65 nm thick $SnO_2$ film as the first layer 1 on the sheet glass substrates. Then, the atmosphere in the vacuum chamber was replaced almost completely by a mixture gas composed of 40 vol.% of argon and 60 vol.% of oxygen, and the pressure was adjusted to 0.40 Pa. Sputtering was carried out for a predetermined period of time by applying a cathode voltage of 480 V and a cathode current of 8 A to the titanium target to form a 50 nm thick $TiO_2$ film as the second layer 2 on the $SnO_2$ film 1. Finally, the atmosphere in the vacuum chamber was replaced almost completely by a mixture gas composed of 20 vol.% of argon and 80 vol.% of oxygen, and the pressure was adjusted to 0.40 Pa. Sputtering was carried out for a predetermined period of time by applying a cathode voltage of 400 V and a cathode current of 5 A to the tin target to form a 50 nm thick $SnO_2$ film as the third layer 3 on the $TiO_2$ film 2. The thus obtained sample of the heat ray screening glass as Example 1 was examined for optical characteristics and for difference in color from the sheet glass substrate. The differences, $\Delta x$ and $\Delta y$ in the Table 1 were obtained in such a manner that the chromaticity coordinates (x,y) of the glass substrate were subtracted from those of the sample, respectively. The results are shown in Table 1. The durability testing of the sample was performed for chemical resistance, moisture resistance, and abrasion resistance. The results are shown in Table 2.

It is apparent from Tables 1 and 2 that the sample has a good heat ray screening performance and transmits visible light without appreciably changing the color of the sheet glass substrate. The sample gave a spectral reflectance curve as shown in FIG. 2A. It is apparent from FIG. 2A that the sample reduces the reflectance of blue and red colors. After the durability testings, the tested sample showed negligible change in optical characteristics and also showed neither indication of film peeling nor noticeable scratch.

TABLE 1

| Example No. | Color and thickness of glass substrate | Thickness (nm) of films | | | | Transmission | | | |
|---|---|---|---|---|---|---|---|---|---|
| | | 1st layer $SnO_2$ | 2nd layer $TiO_2$ | Nitride TiN | 3rd layer $SnO_2$ | Visible light transmittance (%) | Solar radiation transmittance (%) | $\Delta x$ | $\Delta y$ |

TABLE 1-continued

| | | | | | | | | | |
|---|---|---|---|---|---|---|---|---|---|
| 1 | bronze 4 mm | 65 | 50 | — | 50 | 75.2 | 61.4 | 0.0019 | 0.0010 |
| 2 | bronze 4 mm | 65 | 50 | 5 | 46 | 71.4 | 57.8 | 0.0024 | 0.0008 |
| 3 | bronze 4 mm | 55 | 45 | — | 45 | 75.3 | 60.5 | 0.0003 | 0.0033 |
| 4 | bronze 4 mm | 70 | 45 | — | 45 | 73.5 | 61.0 | 0.0031 | 0.0015 |
| 5 | bronze 4 mm | 70 | 55 | — | 45 | 72.7 | 61.6 | 0.0011 | −0.0032 |
| 6 | bronze 4 mm | 55 | 55 | — | 55 | 73.5 | 62.7 | 0.0035 | 0.0016 |
| 7 | bronze 4 mm | 70 | 45 | — | 55 | 75.1 | 62.7 | 0.0012 | −0.0024 |
| 8 | clear 4 mm | 65 | 50 | 10 | 55 | 72.1 | 60.9 | 0.0026 | 0.0008 |
| 9 | clear 4 mm | 70 | 45 | 10 | 45 | 70.5 | 59.1 | 0.0011 | −0.0003 |
| 10 | bronze 3.5 mm | 70 | 50 | 5 | 50 | 70.7 | 55.9 | 0.0010 | −0.0029 |
| 11 | bronze 3.5 mm | 67 | 38 | 6 | 47 | 72.6 | 58.9 | 0.0050 | 0.0062 |
| 12 | bronze 3.5 mm | 64 | 30 | 6 | 57 | 73.4 | 58.1 | 0.0053 | 0.0102 |
| Compar. | bronze 4 mm | 62 | — | 6 | 62 | 71.0 | 56.6 | 0.0111 | 0.0021 |

| | Reflectance on films | | | Reflectance on glass | | |
|---|---|---|---|---|---|---|
| Example No. | Visible light reflectivity (%) | Δx | Δy | Visible light reflectivity (%) | Δx | Δy |
| 1 | 10.8 | −0.0162 | −0.0076 | 8.9 | −0.0074 | −0.0014 |
| 2 | 9.1 | −0.0210 | −0.0041 | 8.8 | 0.0250 | −0.0072 |
| 3 | 10.0 | 0.0027 | −0.0265 | 9.8 | 0.0016 | −0.0248 |
| 4 | 12.0 | −0.0211 | −0.0109 | 11.8 | −0.0211 | −0.0097 |
| 5 | 12.8 | −0.0096 | 0.0199 | 12.5 | −0.0101 | 0.0199 |
| 6 | 8.7 | −0.0247 | −0.0195 | 8.6 | −0.0230 | −0.0181 |
| 7 | 10.9 | −0.0132 | 0.0163 | 10.8 | −0.0131 | 0.0161 |
| 8 | 4.8 | −0.0108 | 0.0257 | 12.5 | −0.0206 | 0.0230 |
| 9 | 6.6 | 0.0098 | 0.0270 | 10.8 | −0.0226 | −0.0094 |
| 10 | 8.3 | −0.0106 | 0.0190 | 11.2 | −0.0109 | 0.0187 |
| 11 | 10.0 | −0.0198 | −0.0137 | 9.4 | −0.0272 | −0.0143 |
| 12 | 7.5 | 0.0058 | −0.0186 | 8.1 | −0.0172 | −0.0292 |
| Compar. | 7.2 | −0.0111 | −0.0816 | 8.5 | 0.0027 | −0.0360 |

Δx and Δy are the respective differences obtained by subtracting the chromaticity coordinates (x, y) of the glass substrate from the chromaticity coordinates (x, y) of the sample.

TABLE 2

| Testing Item | Chemical resistance | | | | Moisture resistance | | Abrasion resistance | |
|---|---|---|---|---|---|---|---|---|
| Testing condition | 1N H$_2$SO$_4$ 25° C., 24 h | | 1N NaOH 25° C., 24 h | | 50° C., 95% RH 2 weeks | | Taber abrasion method | |
| Example No. | Δx | Δy | Δx | Δy | Δx | Δy | Δy | ΔH(%) |
| 1 | −0.4 | 0.4 | −0.8 | 0.7 | −0.4 | 0.2 | −1.9 | 2.3 |
| 2 | −0.2 | 0.3 | −0.8 | 0.9 | −0.1 | 0.3 | −1.7 | 1.9 |

Δx and Δy indicate the change in chromaticity coordinates measured before and after the test. (obtained by subtracting the value obtained before test from the value obtained after test)
ΔH indicates in change in haze measured before and after the test. (obtained by subtracting the value obtained before test from the value obtained after test)

EXAMPLE 2

A 4 mm thick colored sheet glass 5, measuring 100 mm × 100 mm ("Bronze pane", a product of Nippon Sheet Glass Co., Ltd.) was mounted on the substrate holder in the same apparatus as used in Example 1. The vacuum chamber was evacuated to $7 \times 10^{-4}$ Pa using a cryopump. Into the vacuum chamber was introduced a mixture gas composed of 20 vol.% of argon and 80 vol.% of oxygen, and the pressure was adjusted to 0.33 Pa. Sputtering was carried out for a predetermined period of time by applying a cathode voltage of 400 V and a cathode current of 5 A to the tin target to form a 65 nm thick SnO$_2$ film 1 on the sheet glass substrate. Then, the atmosphere in the vacuum chamber was replaced almost completely by a mixture gas composed of 40 vol.% of argon and 60 vol.% of oxygen, and the pressure was adjusted to 0.40 Pa. Sputtering was carried out for a predetermined period of time by applying a cathode voltage of 480 V and a cathode current of 8 A to the titanium target to form a 50 nm thick TiO$_2$ film 2 on the SnO$_2$ film 1. Further, the atmosphere in the vacuum chamber was replaced almost completely by a mixture gas composed of 94 vol.% of argon and 6 vol.% of nitrogen, and the pressure was adjusted to 0.40 Pa. Sputtering was carried out for a predetermined period of time by applying a cathode voltage of 390 V and a cathode current of 3A to the titanium target to form a 5 nm thick titanium nitride film 4 on the TiO$_2$ film 2. Finally, the atmosphere in the vacuum chamber was replaced almost completely by a mixture gas composed of 20 vol.% of argon and 80 vol.% of oxygen, and the pressure was adjusted to 0.33 Pa. Sputtering was carried out for a predetermined period of time by applying a cathode voltage of 400 V and a cathode current of 5 A to the tin target to form a 46 nm thick SnO$_2$ film 3 on the TiO$_2$ film 4. The thus obtained sample of the heat ray screening glass as Example 2 was examined for optical characteristics and for difference in color from the sheet glass substrate according to the same procedure as the Example 1. The results are shown in Table 1. The durability testing of the sample was performed for chemical resistance, moisture resistance, and abrasion resistance. The results are shown in Table 2.

It is apparent from Tables 1 and 2 that the sample has a good heat ray screening performance and transmits visible light without appreciably changing the color of the sheet glass substrate. The sample gave a spectral reflectance curve as shown in FIG. 2B. It is apparent from FIG. 2B that the sample reduces the reflectance of blue and red colors. After the durability testings, the tested sample showed negligible change in optical characteristics and also showed neither indication of film peeling nor noticeable scratch.

EXAMPLE 3

The same procedure as in the Example 1 was repeated to give a sample of heat ray screening glass as Example 3 having a 55 nm thick $SnO_2$ film as the first layer 1, a 45 nm thick $TiO_2$ film as the second layer 2, and 45 nm thick $SnO_2$ film as the third layer 3. The sample was examined according to the same procedure as the Example 1, the results being shown in Table 1. It is apparent from Table 1 that the sample has a good heat ray screening performance and indicates a color which is not greatly different from that of the sheet glass substrate.

EXAMPLE 4

The same procedure as in the Example 1 was repeated to give a sample of heat ray screening glass as Example 4 having a 70 nm thick $SnO_2$ film as the first layer 1, a 45 nm thick $TiO_2$ film as the second layer 2, and 45 nm thick $SnO_2$ film as the third layer 3. The sample was examined according to the same procedure as the Example 1, the results being shown in Table 1. It is apparent from Table 1 that the sample has a good heat ray screening performance and indicates a color which is not greatly different from that of the sheet glass substrate.

EXAMPLE 5

The same procedure as in the Example 1 was repeated to give a sample of heat ray screening glass as Example 5 having a 70 nm thick $SnO_2$ film as the first layer 1, a 55 nm thick $TiO_2$ film as the second layer 2, and 45 nm thick $SnO_2$ film as the third layer 3. The sample was examined according to the same procedure as the Example 1, the results being shown in Table 1. It is apparent from Table 1 that the sample has a good heat ray screening performance and indicates a color which is not greatly different from that of the sheet glass substrate.

EXAMPLE 6

The same procedure as in the Example 1 was repeated to give a sample of heat ray screening glass as Example 6 having a 55 nm thick $SnO_2$ film as the first layer 1, a 55 nm thick $TiO_2$ film as the second layer 2, and a 55 nm thick $SnO_2$ film as the third layer 3. The sample was examined according to the same procedure as the Example 1, the results being shown in Table 1. It is apparent from Table 1 that the sample has a good heat ray screening performance and indicates a color which is not greatly different from that of the sheet glass substrate.

EXAMPLE 7

The same procedure as in the Example 1 was repeated to give a sample of heat ray screening glass as Example 7 having a 70 nm thick $SnO_2$ film as the first layer 1, a 45 nm thick $TiO_2$ film as the second layer 2, and a 55 nm thick $SnO_2$ film as the third layer 3. The sample was examined according to the same procedure as the Example 1, the results being shown in Table 1. It is apparent from Table 1 that the sample has a good heat ray screening performance and indicates a color which is not greatly different from that of the sheet glass substrate.

EXAMPLE 8

The same procedure as in the Example 2 was repeated, except that the colored sheet glass substrate was replaced by a 4 mm thick clear (colorless) float glass, to give a sample of heat ray screening glass as Example 8 having a 65 nm thick $SnO_2$ film as the first layer 1, a 50 nm thick $TiO_2$ film as the second layer 2, and 10 nm thick titanium nitride film 4 and a 55 nm thick $SnO_2$ film as the third layer 3 formed consecutively. The sample was examined according to the same procedure as the Example 1, the results being shown in Table 1. It is apparent from Table 1 that the sample has a good heat ray screening performance and indicates a color which is not greatly different from that of the sheet glass substrate.

EXAMPLE 9

The same procedure as in the Example 2 was repeated, except that the colored sheet glass substrate wa replaced by a 4 mm thick clear (colorless) float glass, to give a sample of heat ray screening glass having a 70 nm thick $SnO_2$ film as the first layer 1, a 45 nm thick $TiO_2$ film as the second layer 2, and a 10 nm thick titanium nitride film 4 and a 45 nm thick $SnO_2$ film as the third layer 3 formed consecutively. The sample was examined according to the same procedure as the Example 1, the results being shown in Table 1. It is apparent from Table 1 that the sample has a good heat ray screening performance and indicates a color which is not greatly different from that of the sheet glass substrate.

EXAMPLE 10

The same procedure as in the Example 2 was repeated, except that the colored sheet glass substrate was replaced by a 3.5 mm thick Bronze Pane colored glass, to give a sample of heat ray screening glass as Example 10 having a 70 nm thick $SnO_2$ film as the first layer 1, a 50 nm thick $TiO_2$ film as the second layer 2, and a 5 nm thick titanium nitride film 4 and a 50 nm thick $SnO_2$ film as the third layer 3 formed consecutively. The sample was examined according to the same procedure as the Example 1, the results being shown in Table 1. It is apparent from Table 1 that the sample has a good heat ray screening performance and indicates a color which is not greatly different from that of the sheet glass substrate.

EXAMPLE 11

The safe procedure as in the Example 2 was repeated, except that the colored sheet glass substrate was replaced by a 3.5 mm thick Bronze Pane colored glass, to give a sample of heat ray screening glass as Example 11 having a 67 nm thick $SnO_2$ film as the first layer 1, a 38 nm thick $TiO_2$ film as the second layer 2, and a 6 nm thick titanium nitride film 4 and a 47 nm thick $SnO_2$ film as the third layer 3 formed consecutively. The sample was examined according to the same procedure as the Example 1, the results being shown in Table 1. It is apparent from Table 1 that the sample has a good heat ray screening performance and indicates a color which is not greatly different from that of the sheet glass substrate.

EXAMPLE 12

The same procedure as in the Example 2 was repeated, except that the colored sheet glass substrate was replaced by a 3.5 mm thick Bronze Pane colored glass, to give a sample of heat ray screening glass as Example 12 having a 64 nm thick $SnO_2$ film as the first layer 1, a 30 nm thick $TiO_2$ film as the second layer 2, and a 6 nm thick titanium nitride film 4 and a 57 nm thick $SnO_2$ film as the third layer 3 formed consecutively. The sample was examined according to the same procedure as the Example 1, the results being shown in Table 1. It is apparent from Table 1 that the sample has a good heat ray screening performance and indicates a color which is not greatly different from that of the sheet glass substrate.

COMPARATIVE EXAMPLE

A 4 mm thick colored sheet glass ("Bronze pane", a product of Nippon Sheet Glass Co., Ltd.), measuring 100 mm ×100 mm, was mounted on the substrate holder in the same apparatus as used in the Example 1. The vacuum chamber was evacuated to $7\times10^{-4}$ Pa using a cryopump. Into the vacuum chamber was introduced a mixture gas composed of 20 vol.% of argon and 80 vol.% of oxygen, and the pressure was adjusted to 0.33 Pa. Sputtering was carried out for a predetermined period of time by applying a cathode voltage of 400 V and a cathode current of 5 A to the tin target to form a 62 nm thick $SnO_2$ film on the sheet glass substrate. Then, the atmosphere in the vacuum chamber was replaced almost completely by a mixture gas composed of 94 vol.% of argon and 6 vol.% of oxygen, and the pressure was adjusted to 0.40 Pa. Sputtering was carried out for a predetermined period of time by applying a cathode voltage of 480 V and a cathode current of 8 A to the titanium target to form a 6 nm thick titanium nitride film on the $SnO_2$ film. Finally, into the vacuum chamber was introduced a mixture gas composed of 20 vol.% of argen and 80 vol.% of oxygen, and the pressure was adjusted to 0.33 Pa. Sputtering was carried out for a predetermined period of time by applying a cathode voltage of 400 V and a cathode current of 5 A to the tin target to form a 62 nm thick $SnO_2$ film on the titanium nitride film. The thus obtained sample of the heat ray screening glass as Comparative Example was examined for optical characteristics and for difference in color from the sheet glass substrate according to the same procedure as the Example 1. The results are shown in Table 1.

It is apparent from Table 1 that the sample transmits visible light with appreciable change in color from that of the sheet glass substrate. The sample indicated the reflected light which made the sample look apparently different from the sheet glass substrate. This sample gave a spectral reflectance curve as shown in FIG. 3. It is apparent from FIG. 3 that the sample has an increased reflectance in the red wavelength zone; therefore, it takes on a strong red color.

The present invention provides a glass which screens heat rays without changing color of sheet glass substrate, while keeping high visible light transmittance. In addition, the glass of the present invention has such high durability that it can be used alone without the need of being made into laminated glass.

Therefore, it will find an use as automotive window glass, without causing any problem associated with design and without increasing weight of automobile. It reduces solar radiation energy entering automotive room and hence prevents temperature from rising in the room, thereby reducing the load for cooling system in automobile.

What is claimed is:

1. A heat ray screening glass for automotive window glass consisting of:
   a sheet glass substrate,
   a first layer covering the sheet glass and which is 55 nm to 70 nm thick and has a refractive index of 1.8 to 2.1 at a wavelength of 550 nm,
   a second layer covering the first layer and consisting of a $TiO_2$ film which is 30 nm to 55 nm thick and has a refractive index of 2.3 to 2.5 at a wavelength of 550 nm, and
   a third layer covering the second layer which is 45 nm to 55 nm thick and has a refractive index of 1.8 to 2.1 at a wavelength of 550 nm,
   wherein the absolute value of each difference in chromaticity coordinates is less than 0.03, the difference being obtained by subtracting the chromaticity coordinates of the sheet glass substrate from the chromaticity coordinates of the heat ray screening glass, respectively.

2. A heat ray screening glass according to claim 1, further comprising a film, interposed between the second layer and the third layer, and which consists of nitride of Ti, Zr or Hf and has a thickness not greater than 10 nm.

3. A heat ray screening glass according to claim 1 wherein the first layer consists of an oxide film selected from a group of $SnO_2$, $ZrO_2$, $Al_2O_3$, $Ta_2O_5$, ZnO and $In_2O_3$, and the third layer consists of an oxide film selected from the group.

4. A heat ray screening glass according to claim 1 wherein the first, second and third layers are substantially transparent.

5. A heat ray screening glass according to claim 3, wherein the first layer and the third layer consist of a $SnO_2$ film.

6. A heat ray screening glass for automotive window glass consisting of:
   a sheet glass substrate
   a first layer covering the sheet glass and which is 55 nm to 70 nm thick and has a refractive index of 1.8 to 2.1 at a wavelength of 550 nm,
   a second layer covering the first layer and consisting of a $TiO_2$ film which is 30 nm to 55 nm thick and has a refractive index of 2.3 to 2.5 at a wavelength of 550 nm,
   a third layer covering the second layer which is 45 nm to 55 nm thick and has a refractive index of 1.8 to 2.1 at a wavelength of 550 nm, and
   a film, interposed between the second layer and the third layer, and which consists of nitride of Ti, Zr or Hf and has a thickness not greater than 10 nm,
   wherein the absolute value of each difference in chromaticity coordinates is less than 0.03, the difference being obtained by subtracting the chromaticity coordinates of the sheet glass substrate from the chromaticity coordinates of the heat ray screening glass, respectively.

7. A heat ray screening glass according to claim 6, wherein the first layer consists of an oxide film selected from a group of $SnO_2$, $Al_2O_3$, $Al_2O_5$, ZnO and $In_2O_3$, and the third layer consists of an oxide film selected from the group.

8. A heat ray screening glass according to claim 6, wherein the first, second and third layers are substantially transparent.

9. A heat ray screening glass according to claim 7, wherein the first layer and the third layer consist of a $SnO_2$ film.

* * * * *